United States Patent
Macours et al.

(10) Patent No.: US 10,043,515 B2
(45) Date of Patent: Aug. 7, 2018

(54) VOICE ACTIVATION SYSTEM

(71) Applicant: NXP B.V., Eindhoven (NL)

(72) Inventors: Christophe Macours, Hodelge (BE); Shawn Scarlett, Nijmegen (NL)

(73) Assignee: NXP B.V., Eindhoven (NL)

( * ) Notice: Subject to any disclaimer, the term of this patent is extended or adjusted under 35 U.S.C. 154(b) by 20 days.

(21) Appl. No.: 15/384,461

(22) Filed: Dec. 20, 2016

(65) Prior Publication Data

US 2017/0178628 A1    Jun. 22, 2017

(30) Foreign Application Priority Data

Dec. 22, 2015   (EP) ..................................... 15201872

(51) Int. Cl.
*G10L 15/20*    (2006.01)
*G10L 15/22*    (2006.01)
(Continued)

(52) U.S. Cl.
CPC ............ *G10L 15/22* (2013.01); *G06F 1/3287* (2013.01); *G10L 15/08* (2013.01); *G10L 15/32* (2013.01);
(Continued)

(58) Field of Classification Search
CPC ......... G10L 25/78; G10L 15/20; G10L 17/00; G10L 15/22; G10L 15/222;
(Continued)

(56) References Cited

U.S. PATENT DOCUMENTS 5,765,130 A * 6/1998 Nguyen .................. G10L 25/78
                                                      704/231
6,061,651 A * 5/2000 Nguyen .................. G10L 25/78
                                                      379/67.1
(Continued)

FOREIGN PATENT DOCUMENTS

EP        1503368 A1     2/2005

OTHER PUBLICATIONS

Brueckmann et al., ("Adaptive Noise Reduction and Voice Activity Detection for improved Verbal Human-Robot Interaction using Binaural Data" 2007 IEEE International Conference on Robottics and Automation, Roma, Italy, Oct. 14, 2007, pp. 1782-1787).*

(Continued)

*Primary Examiner* — Vijay B Chawan

(57) ABSTRACT

A voice activation system is described including a first voice activity detector for receiving a first signal from a microphone; a second voice activity detector for receiving a second signal from a speaker; a voice detector output coupled to the output of the first voice activity detector and the second voice activity detector. The first detector and the second detector are operable to generate an output signal in response to a candidate speech signal received on the respective detector inputs and the voice activation system is configured to generate a voice detector output signal when at least one of the first detector output and the second detector output indicate that speech has been detected. The voice activation system may reduce the average power consumption and increase the recognition rate of an always-on voice activation solution for headsets or other mobile audio devices.

15 Claims, 4 Drawing Sheets

(51) Int. Cl.
  *G06F 1/32* (2006.01)
  *G10L 15/08* (2006.01)
  *G10L 15/32* (2013.01)
  *G10L 25/84* (2013.01)
  *G10L 25/78* (2013.01)
(52) U.S. Cl.
  CPC .............. *G10L 25/78* (2013.01); *G10L 25/84* (2013.01); *G10L 2015/088* (2013.01); *H04R 2400/01* (2013.01); *H04R 2499/11* (2013.01)
(58) Field of Classification Search
  CPC ......... G10L 2015/088; G10L 2025/786; G10L 25/21; G10L 15/01; G10L 15/063; G10L 15/08; G10L 15/14; G10L 15/16; G10L 15/24; G10L 15/26; G10L 17/22; G10L 2015/025; G10L 2015/223; G10L 21/0208; G10L 25/30; G10L 25/51
  USPC ....... 704/233, 246, 231, 251, 270, 228, 236, 704/244, 254, 256, 266, 275
  See application file for complete search history.

(56) References Cited

U.S. PATENT DOCUMENTS

| | | | | |
|---|---|---|---|---|
| 6,198,947 | B1* | 3/2001 | Barber | H04M 1/271 379/88.02 |
| 7,219,062 | B2* | 5/2007 | Colmenarez | G10L 15/24 382/100 |
| 8,577,062 | B2 | 11/2013 | Goldstein et al. | |
| 9,026,438 | B2* | 5/2015 | Buck | G10L 15/222 379/208.01 |
| 9,076,459 | B2* | 7/2015 | Braho | G10L 25/78 |
| 9,443,517 | B1* | 9/2016 | Foerster | G10L 15/08 |
| 9,792,907 | B2* | 10/2017 | Bocklet | G10L 17/22 |
| 2001/0039494 | A1* | 11/2001 | Burchard | G10L 15/26 704/246 |
| 2005/0136848 | A1 | 6/2005 | Murray | |
| 2006/0100870 | A1* | 5/2006 | Shikano | G10L 15/20 704/254 |
| 2007/0198268 | A1* | 8/2007 | Hennecke | G10L 15/22 704/270 |
| 2009/0254342 | A1* | 10/2009 | Buck | G10L 15/222 704/233 |
| 2009/0271190 | A1 | 10/2009 | Niemisto et al. | |
| 2014/0093093 | A1 | 4/2014 | Dusan et al. | |
| 2014/0270312 | A1 | 9/2014 | Melanson et al. | |
| 2015/0120299 | A1 | 4/2015 | Thomsen et al. | |
| 2015/0139428 | A1 | 5/2015 | Reining et al. | |
| 2015/0281853 | A1* | 10/2015 | Eisner | H04R 25/505 381/312 |

OTHER PUBLICATIONS

Extended European Search Report for Patent Appln. No. 15201872.7 (dated Mar. 30, 2016).

* cited by examiner

VOICE ACTIVATION SYSTEM

CROSS-REFERENCE TO RELATED APPLICATIONS

This application claims the priority under 35 U.S.C. § 119 of European patent application no. 15201872.7, filed Dec. 22, 2105 the contents of which are incorporated by reference herein.

FIELD

This disclosure relates to a voice activation system for a mobile audio device.

BACKGROUND

Mobile audio devices such as mobile phones are getting smarter and are more and more equipped with "always-on" functionalities, which continuously sense the environment to perform anticipative actions such as device wake-up, voice keyword detection. Always-on functionalities have very low power requirements, which may be typically lower than 1 milliwatt (mW), and usually make use of dedicated sensors and low power hardware components implemented as integrated circuits in order to function independently from the main processor. This is particularly the case for wearable mobile audio devices such as active earbuds or watches. In case of voice activation, the main processor is only woken up by the voice activation system if a dedicated keyword has been recognized. In order to minimize power consumption, a multi-stage detection is usually applied.

SUMMARY

Various aspects are defined in the accompanying claims. In a first aspect there is defined a voice activation system for a mobile audio device comprising a speaker and a microphone, the voice activation system comprising: a first voice activity detector having a first detector input for receiving a first signal from a microphone and a first detector output; a second voice activity detector having a second detector input for receiving a second signal from a speaker and a second detector output; a voice detector output coupled to the first detector output and the second detector output; wherein the first detector and the second detector are operable to generate an output signal in response to a candidate speech signal received on the respective detector inputs and wherein the voice activation system is configured to generate a voice detector output signal when at least one of the first detector output and the second detector output indicate that speech has been detected.

In embodiments the voice activity detector may be configured to generate a voice detector output signal when both the first detector output and the second detector output indicate that speech has been detected.

In embodiments, the voice activation system may have a first power mode and a second power mode, wherein in the first power mode only the second voice activity detector is enabled, in the second power mode both the first voice activity detector and the second voice activity detector are enabled, and wherein in operation the voice activation system is configured to change from the first power mode to the second power mode in response to the second detector indicating that speech has been detected.

In embodiments, the voice activation system may comprise a keyword recognizer having a first keyword recognizer input configured to receive at least one of a first signal, a second signal, and a weighted combination of the first signal and the second signal, and a second keyword recognizer input coupled to the voice detector output, wherein the keyword recognizer is enabled in response to a signal on the voice detector output indicating that speech has been detected, and wherein the keyword recognizer is operable to generate an output in response to a speech signal comprising a keyword received on the first keyword recognizer input.

The keyword recognizer may receive a first signal from a microphone, a second signal from a speaker-as-microphone or a weighted combination of the first signal and the second signal. The received signal may be provided by a mixer.

In embodiments, the voice activation system may comprise a speech recognizer having a first speech recognizer input configured to receive at least one of a first signal, a second signal, and a weighted combination of the first signal and the second signal, and a second speech recognizer input coupled to the keyword recognizer output, wherein the speech recognizer is enabled in response to the keyword recognizer indicating that a keyword has been detected.

The speech recognizer may be enabled in response to a keyword being detected. The speech recognizer may receive a first signal from a microphone, a second signal from a speaker-as-microphone or a weighted combination of the microphone signal. The received signal may be provided by a mixer.

In embodiments the voice activation system may comprise a speech recognizer having a first speech recognizer input configured to receive at least one of a first signal, a second signal, and a weighted combination of the first signal and the second signal, and a second speech recognizer input coupled to the voice detector output, and wherein the speech recognizer is enabled in response to speech being detected.

In embodiments, the voice activation system may comprise a microphone buffer coupled to the first detector input, wherein the first voice activity detector is configured to receive a buffered signal from the microphone.

In embodiments, the voice activation system may comprise a speaker-as-microphone buffer coupled to the second detector input, wherein the second detector is configured to receive a buffered signal from the speaker configured as a microphone.

Embodiments of the voice activation system may be included in a headset comprising a microphone coupled to the first voice activity detector input and a speaker coupled to the second voice activity detector input.

Embodiments of the voice activation system may be included in a hearing aid comprising a microphone coupled to the first voice activity detector input and a speaker coupled to the second voice activity detector input.

Embodiments of the voice activation system may be included in a mobile audio device comprising a microphone coupled to the first voice activity detector input and a speaker coupled to the second voice activity detector input.

In a second aspect there is defined a method of voice activation for an audio device comprising a speaker and a microphone, the method comprising: generating a first detector output signal in response to a first signal comprising a candidate speech signal from a microphone; generating a second detector output signal in response to a second signal comprising the candidate speech signal from a speaker configured as a microphone; generating a voice activity output signal in response to at least one of the first detector output signal and the second detector output signal.

In embodiments, the method may further comprise generating a voice activity output signal in response to both the first detector output signal and the second detector output signal.

In embodiments of the method, the second detector output signal may be generated in response to the first detector output signal and the second signal comprising the candidate speech signal from a speaker configured as a microphone.

In embodiments, the method may comprise activating a keyword detector in response to the voice activity detector output signal.

In embodiments, the method may comprise detecting a keyword and activating a speech recognizer in response to detecting a keyword.

In embodiments, the method may further comprise buffering at least one of the first signal and the second signal.

BRIEF DESCRIPTION OF DRAWINGS

In the figures and description like reference numerals refer to like features. Embodiments are now described in detail, by way of example only, illustrated by the accompanying drawings in which.

DESCRIPTION

Figure 1:
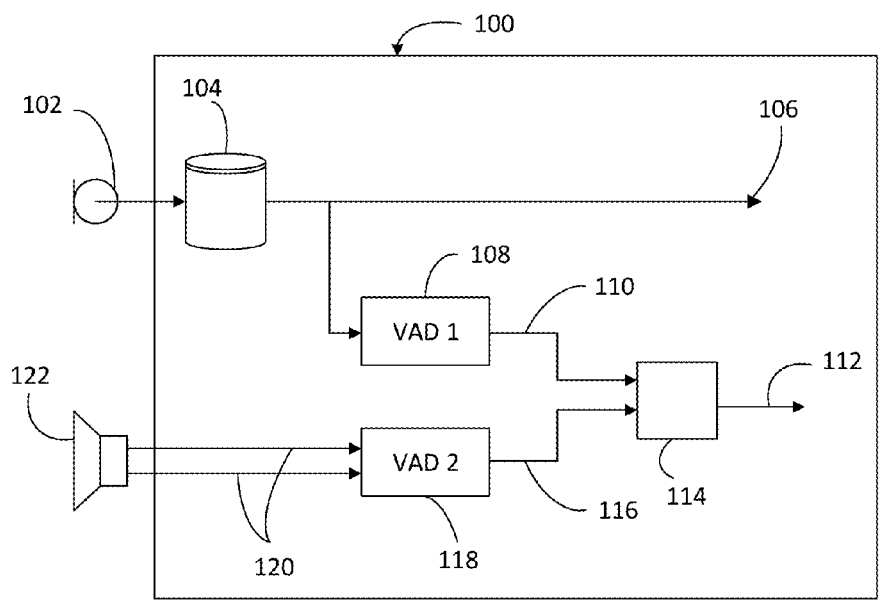
FIG. 1 shows a voice activation system according to an embodiment.

FIG. 1 shows a voice activation system 100. The voice activation system 100 includes a buffer 104 for buffering a microphone signal, a first voice activity detector 108, a second voice activity detector 118, and a router 114. The buffer output 106 is connected to the first voice activity detector 108. An output 110 of the first voice activity detector 108 is connected to an input of the router 114. An output 116 of the second voice activity detector 118 is connected to a second input of the router 114. The router 114 has a router output 112 which may be considered as the voice detector output.

In operation of the voice activation system 100, the buffer 104 is connected to a microphone 102, and the input 120 of the second voice activity detector 118 may be connected to a loudspeaker 122. A signal is received via the microphone 102, which is buffered using the buffer 104. The buffer 104 may provide temporary storage of the signal received via the microphone and may be implemented for example as a FIFO memory. In other examples the buffer 104 may be omitted.

The buffered output may be input to the first voice activity detector 108. A further signal is received via the loudspeaker 122 and input into the second voice activity detector 118. The signal, and the further signal may have characteristics which indicate that the signal contains speech, that is to say the source of the respective signal or the further signal may be somebody speaking. The signal and the further signal may be considered as candidate speech signals. The first voice activity detector 108 processes the buffered input signal and generates an output if the buffered signal has characteristics indicative of speech. The second voice activity detector 118 processes the signal received from the loudspeaker 122, which is effectively being used as a microphone, and generate an output if the signal received from the loudspeaker 122 has characteristics indicative of speech. The router 114 may generate an output signal on the router output 112 if either the first voice activity detector 108, or the second voice activity detector 118 indicates that speech has been detected. Alternatively or in addition, the router 114 may generate an output signal on the router output 112 only when both the first voice activity detector 108, and the second voice activity detector 118 generate an output signal indicating that speech has been detected. The router output signal may be for example a logical value, or an interrupt.

The first voice activity detector 108, and the second voice activity detector 118 may be implemented for example in hardware using analogue or digital filtering, or alternatively in software implemented on one or more digital signal processors, which may be low power digital signal processors for example consuming less than 1 mW. The voice activation system 100 may have a low power mode of operation whereby only the second voice activity detector 118 may be enabled. Since the loudspeaker 122 in many mobile audio devices does not require any power if used as a microphone, by having a first power mode whereby only the second voice activity detector 118 is enabled, the power consumption may be reduced further.

Alternatively or in addition, by only outputting a detection signal on the router output 112, when both the first voice activity detector 108, and the second voice activity detector 118 indicate that speech has been detected, the reliability of the speech detection may be significantly improved. This is because the inventors of the present application have realised that in many applications, a loudspeaker 122 may be acoustically coupled to a user. For example if the voice activity detector 100 is incorporated in a mobile phone, in a handset mode of operation the speaker may be pressed against the ear of a user, whereas the microphone is not in close contact with a user. In this case the sounds resulting in false positive results for speech detection are typically different and so by combining the signals, the false positive detector results may be reduced or eliminated. Since false triggers due to signals being incorrectly identified as speech may result in high power modes being incorrectly enabled, by reducing false positive detector results, the power consumption of a mobile device may be reduced.

Table 1 illustrates an example of signal sources that may be accepted or rejected as speech by the first voice activity detector 108, denoted as the Microphone Voice Activity Detector (VAD) and the second voice activity detector 118, denoted as the Speaker-as-Microphone VAD. Typically in this example, the speaker will be closely coupled to the ear of a user whereas the microphone is not in close contact with a user. By using a combination of the Speaker-as Microphone VAD and Microphone VAD many of the common sources of background noise may be rejected since only a user talking may be accepted by both the Microphone VAD and the Speaker-as-Microphone VAD.

TABLE 1

|  | Speaker-as-Microphone VAD | Microphone VAD |
| --- | --- | --- |
| User talking | Accept | Accept |
| Interfering Talkers | Reject | Accept |

TABLE 1-continued

| | Speaker-as-Microphone VAD | Microphone VAD |
|---|---|---|
| Radio/TV | Reject | Accept |
| Interfering Double-Talk | Reject | Accept |
| User body noise (e.g. swallowing) | Accept | Reject |
| Handling noise | Accept | Reject |
| Stationary noise. | Reject | Reject |

The voice activation system 100 may be implemented in hardware, software, or a combination of hardware and software. Typical examples of voice activity detectors known to the skilled person may include extraction and classification of features such as zero crossing rate, correlation coefficients and spectral power in different frequency bands.

Figure 2:
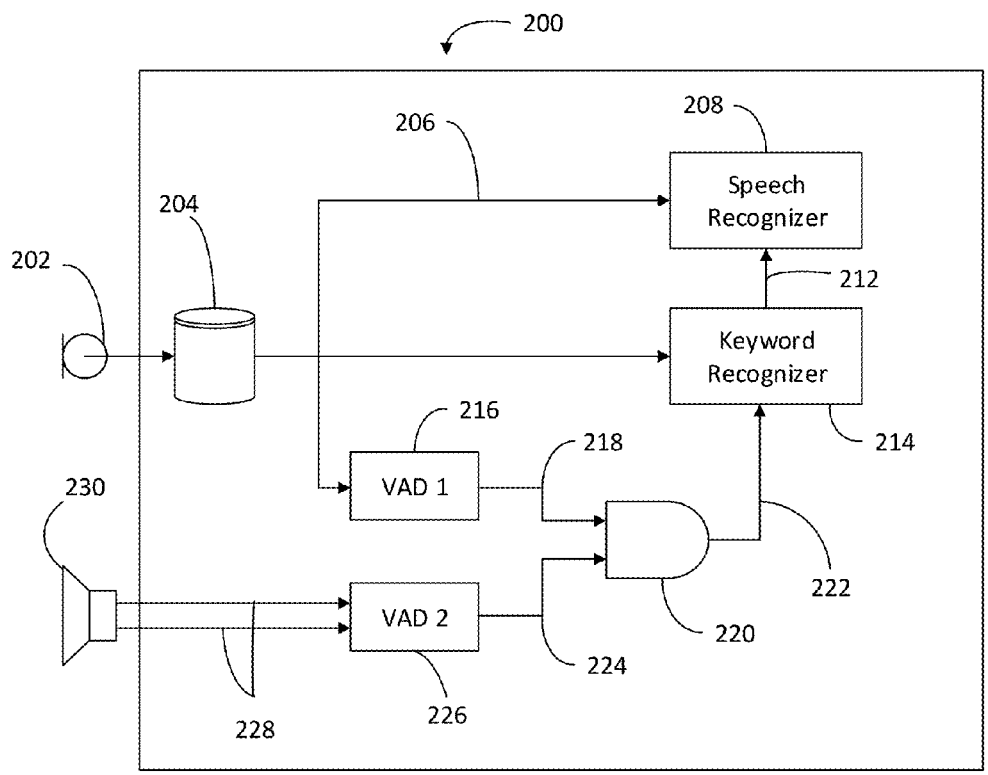
FIG. 2 illustrates a voice activation system according to an embodiment.

FIG. 2 shows a voice activation system 200. The voice activation system 200 may include a buffer 204 for buffering a microphone signal, a keyword recognizer 214, a speech recognizer 208, a first voice activity detector 216, a second voice activity detector 226, and a logic AND-gate or AND-function 220. It will be appreciated that the AND-gate 220 may be implemented as a hardware logic circuit or a software logical AND operation. The buffer output 206 may be connected to the first voice activity detector 216, the keyword recognizer, and the speech recognizer 208. An output 218 of the first voice activity detector 216 may be connected to an input of the AND-gate 220. An output 224 of the second voice activity detector 226 may be connected to a second input of the AND-gate 220. The AND-gate 220 has an AND-gate output 222 which may be connected to a keyword recognizer 214. The AND-gate output 222 may be considered as the voice detector output. An output 212 of the keyword recognizer 214 may be connected to a speech recognizer 208.

In operation of the voice activation system 200, the microphone buffer 204 may be connected to a microphone 202, and the input 228 of the second voice activity detector 226 may be connected to a loudspeaker 230. A signal may be received via the microphone 202, which is buffered using the buffer 204. The buffered output may be input to the first voice activity detector 216. A further signal may be received via the loudspeaker 230 on input 228 to the second voice activity detector 226. The signal, and the further signal may have characteristics which indicate that the signal contain speech, that is to say the source of the respective signal or further signal may be somebody speaking. The signal and the further signal may be considered as candidate speech signals. The first voice activity detector 216 may process the buffered input signal and generate an output if the buffered signal has characteristics indicative of speech. The second voice activity detector 226 may process the signal received from the loudspeaker 230, which is effectively being used as a microphone, and generate an output if the signal received from the loudspeaker 230 has characteristics indicative of speech. The skilled person will appreciate that these characteristics may include for example a higher auto-correlation relative to some background noise sources, a predictable zero-crossing rate, typical energy bursts in amplitude and timing corresponding to alternate speaking and silent periods. The AND-gate 220 may generate an output signal on the AND output 222 when both the first voice activity detector 216, and the second voice activity detector 226 generate an output signal indicating that speech has been detected.

The voice activation system may have a first power mode whereby the first voice activity detector 216, the second voice activity detector 226, the buffer 204, and the AND gate 220 may be enabled. If both first voice activity detector 216 and the second voice activity detector 226 indicate a candidate speech signal, then the output signal generated on the AND output 222 may be used to enable the keyword recogniser 214. Once the keyword recogniser 214 is enabled, the voice activation system may be considered to be in a second power mode. In the second power mode, the keyword recogniser may process the buffered microphone signal contained in buffer 204. By buffering the microphone signal in the buffer 204, the potential speech contained within the signal may be retained for a short period of time, which may reduce the amount of potential data that is lost. The keyword recogniser may be typically implemented by software running on a digital signal processor. The keyword recogniser 214 may process the buffered signal received via the microphone 202. If the buffered signal contains one of the keywords, the keyword recogniser 214 may generate an output event on the keyword recogniser output 212. The output event generated by the keyword recogniser 214 may be used to enable the speech recogniser 208. Once the speech recogniser is enabled, the voice activation system 200 may be considered to be in a third power mode. It will be appreciated that the power consumption required increases from the first power mode to the second power mode to the third power mode. The speech recogniser 208 may recognise more complex words and phrases contained in the signal received via the microphone 202.

The first voice activity detector 216, and the second voice activity detector 226 may be implemented for example in hardware using analogue or digital filtering, or alternatively in software implemented on a digital signal processor (DSP), which may be a low power digital signal processor for example consuming less than 1 mW. The keyword recognizer 212 and the speech recognizer 208 may be implemented in hardware, software or a combination of hardware and software.

Figure 3:
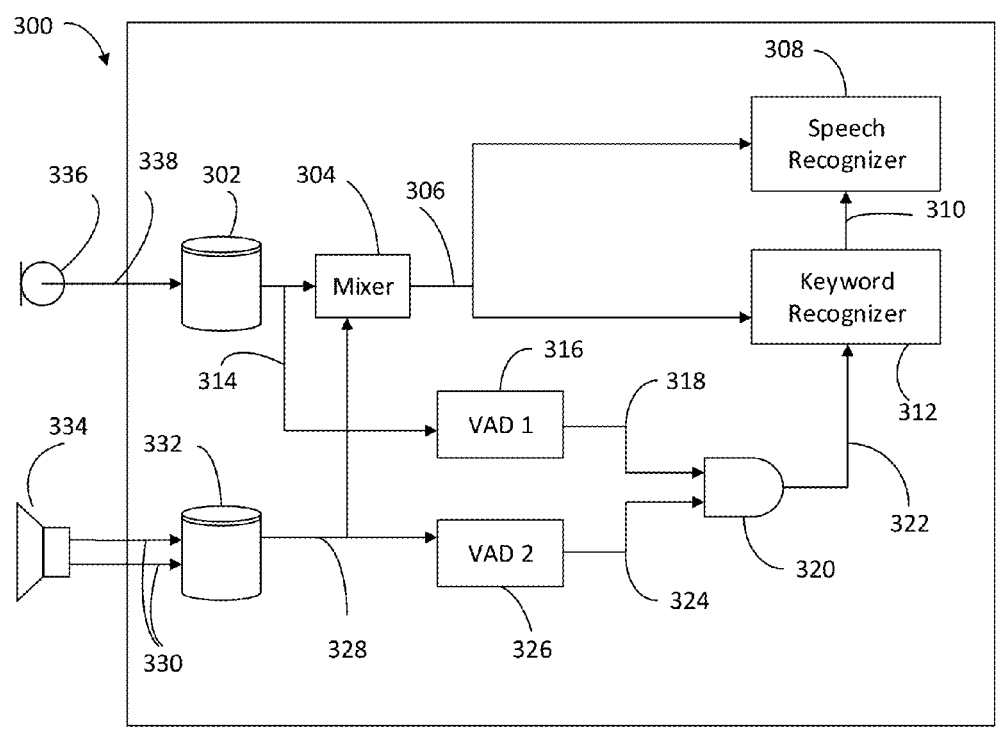
FIG. 3 shows a voice activation system according to an embodiment.

FIG. 3 shows a voice activation system 300. The voice activation system 300 may include a microphone buffer 302 for buffering a microphone signal, a speaker buffer 332 for buffering a speaker-as-microphone signal, a keyword recognizer 312, a speech recognizer 308, a first voice activity detector 316, a second voice activity detector 326, a logic AND-gate or AND-function 320. It will be appreciated that the AND-gate 320 may be implemented as a hardware logic circuit or a software logical AND operation. The microphone buffer output 314 may be connected to the first voice activity detector 316 and a first input of mixer 304. The speaker buffer output 328 may be connected to a second input of mixer 304 and to the second voice activity detector 326. A mixer output 306 may be connected to the speech recognizer 308 and the keyword recognizer 312. An output 318 of the first voice activity detector 316 may be connected to an input of the AND-gate 320. An output 324 of the second voice activity detector 326 may be connected to a second input of the AND-gate 320. The AND-gate 320 has an AND-gate output 322 which may be connected to a keyword recognizer 312. An output 310 of the keyword recognizer 312 may be connected to a speech recognizer 308.

In operation of the voice activation system 300, the microphone buffer 302 may be connected to a microphone 336, and the speaker-as-microphone buffer 332 may have an input 330 connected to a loudspeaker 334. A signal may be received via the microphone 336 and buffered by microphone buffer 302. The buffered output from the microphone 336 may be input to the first voice activity detector 316. A further signal may be received via the speaker 334, which is buffered by the speaker-as-microphone buffer 332. The buffered output from the speaker 334 may be input to the second voice activity detector 316. The signal, and the further signal may have characteristics which indicate that the signal contain speech, that is to say the source of the respective signal or the further signal may be somebody speaking. The signal and the further signal may be considered as candidate speech signals. The first voice activity detector 316 may process the buffered input signal and generate an output if the buffered signal has characteristics indicative of speech. The second voice activity detector 326 may process the signal received from the loudspeaker 334, which is effectively being used as a microphone, and generate an output if the signal received from the loudspeaker 334 has characteristics indicative of speech. The AND-gate 320 may generate an output signal on the AND output 322 when both the first voice activity detector 316, and the second voice activity detector 326 generate an output signal indicating that speech has been detected.

The voice activation system 300 may have a first power mode whereby the first voice activity detector 316, the second voice activity detector 326, the microphone buffer 302, the speaker-as-microphone buffer 332 and the AND gate 320 may be enabled or powered on. If both first voice activity detector 316 and the second voice activity detector 326 indicate a candidate speech signal, then the output signal generated on the AND output 322 may be used to enable the keyword recogniser 322. Once the keyword recogniser 322 is enabled, the voice activation system may be considered to be in a second power mode. In the second power mode, the keyword recogniser may process a weighted mix of the buffered microphone signal and the buffered speaker-as-microphone signal. By buffering the signal and further signal in the microphone buffer 302 and the speaker-as-microphone buffer 322, the potential speech contained within the signal may be retained for a short period of time, typically 1 or 2 milliseconds, which may reduce the amount of potential speech data that is lost. The microphone buffer 302 and the speaker-as-microphone buffer 322 may be implemented by as temporary data store such as for example a FIFO memory structure. The mixing of the speaker-as-microphone signal with the microphone signal may result in an improved signal to noise ratio compared to the microphone signal, since in use, the loudspeaker may be for example closely coupled to the user.

The skilled person will appreciate that the keyword recogniser 312 may for example be implemented by software which may be executed on a digital signal processor or other microprocessor. The keyword recogniser 312 may process the signal on mixer output 306. If the output mixed signal 306 contains one of the keywords, the keyword recogniser 314 may generate an output event on the keyword recogniser output 310. The output event generated by the keyword recogniser 312 may be used to enable the speech recogniser 308. Once the speech recogniser is enabled, the voice activation system 300 may be considered to be in a third power mode. It will be appreciated that the power consumption required increases from the first power mode to the second power mode to the third power mode. The speech recogniser 308 may recognise more complex words and phrases contained in the mixed signal. The skilled person will appreciate that the speech recogniser 308 may for example be implemented in software which may be executed on a digital signal processor or other microprocessor.

The first voice activity detector 316, and the second voice activity detector 326 may be implemented for example in hardware using analogue or digital filtering, or alternatively in software implemented on digital signal processors, which may be low power digital signal processors for example consuming less than 1 mW. The keyword recognizer 312 and the speech recognizer 308 may be implemented in hardware, software or a combination of hardware and software.

In some examples of the voice activation system 300, the keyword recognizer 312 may be omitted and the speech recognizer may be connected to the AND-gate output 322. In other examples the speech recognizer 308 may be omitted.

In some examples of the voice activation system 300, the speech recognizer 308 may be implemented on a cloud computing server and the remainder of the voice activation system 300 may be incorporated into a mobile audio device for example a mobile phone. In this case, once a keyword has been detected by the keyword detector, the output mixed signal 306 may be transmitted over a network by the mobile device to the cloud computing server incorporating the speech recognizer 308. The speech recognizer 308 may transmit the recognized speech data back to the mobile phone.

Figure 4A:
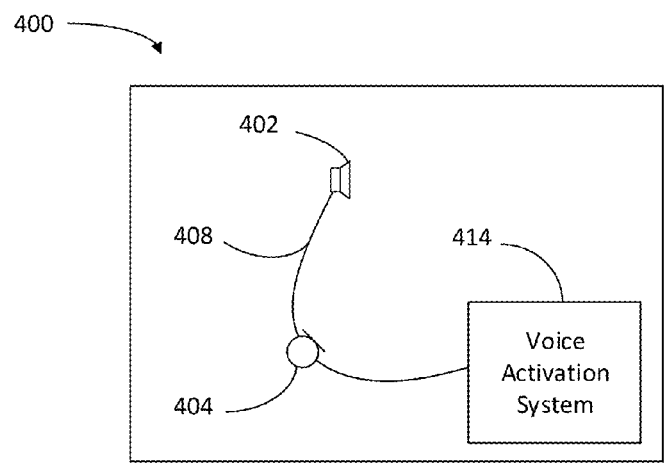
FIG. 4A illustrates a headset including a voice activation system according to an embodiment.
Figure 4B:
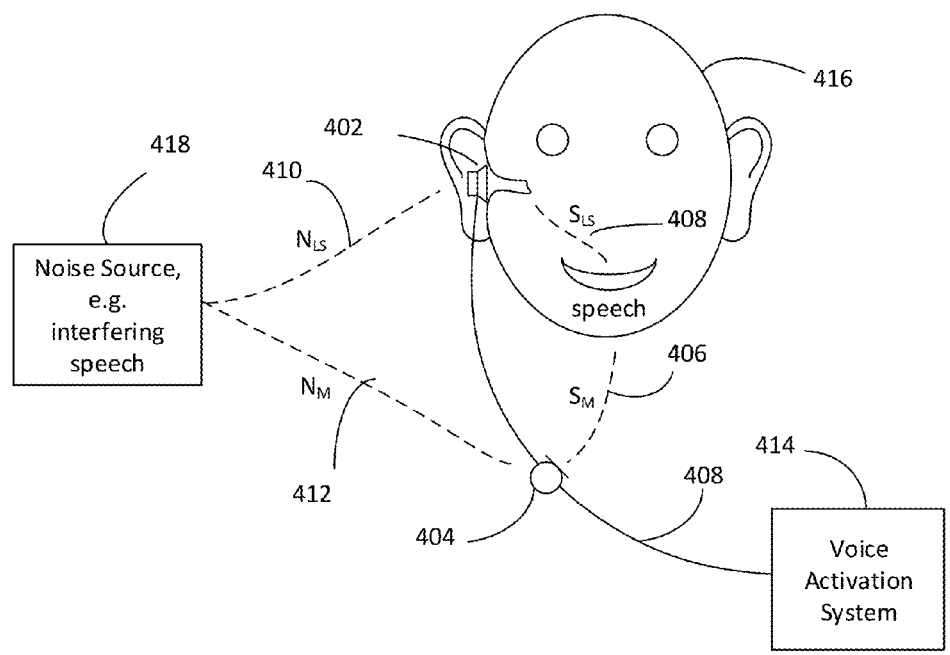
FIG. 4B shows the headset of FIG. 4A in use.

FIG. 4A shows a headset 400 including a voice activation system 414. The microphone 404 of the headset 400, and the speaker 402 of the headset 400 may be coupled to the voice activation system 414 via a connection 408 which may be for example a headset cable. The voice activation system 414 may be implemented using one or more of the embodiments herein described. Now with reference to FIG. 4B which shows the headset 400 in use. In operation, the loudspeaker 402 is typically closely coupled with the ear of a user 416. In normal operation of the loudspeaker 402, that is to say when the loudspeaker is being used to output audio, the loudspeaker 402 may be driven by an audio amplifier (not shown). When used as a microphone, the loudspeaker 402 may capture the speech of the user 416 via a bone conduction path 408 denoted as Sls. The loudspeaker 402 may capture background noise from noise source 418 indicated by air path 410 and denoted Nls. The microphone 404 may capture the speech of the user 416 via the air path 406 denoted as Sm. The microphone 404 may capture background noise from noise source 418 indicated by air path 412 and denoted Nm. Because the headset may at least partially occlude the ear canal, a pressure chamber may be generated with which results in a low frequency boost of the bone conducted speech. As will be appreciated, this amplification effect known as the occlusion effect is conventionally considered undesirable in for example a hearing aids or other mobile devices, since the close coupling can cause a user to hear their own speech in a distracting way which may for example impair the intelligibility of speech from another person. The inventor of the present application has realised that this low frequency boost typically emphasises the voiced user speech components, which may improve the signal-to-noise ratio in the presence of background noise from noise source 418. The noise source 418 may include sources such as interfering speech, environmental noise such as wind noise or other noise sources. The energy of such noise sources is typically concentrated at the low frequencies, which may include for example frequencies below 1 kHz.

In other examples, a voice activation system as herein described may be incorporated into mobile audio devices such as, for example mobile phones, hearing aids, wearable devices, laptops, tablet computers, and so-called hearable devices. The voice activation system herein described when incorporated into mobile audio devices, may improve the reliability of the voice activity detection without any increase in components since, typically the speaker and microphone may already be required for other functionality.

Figure 5:
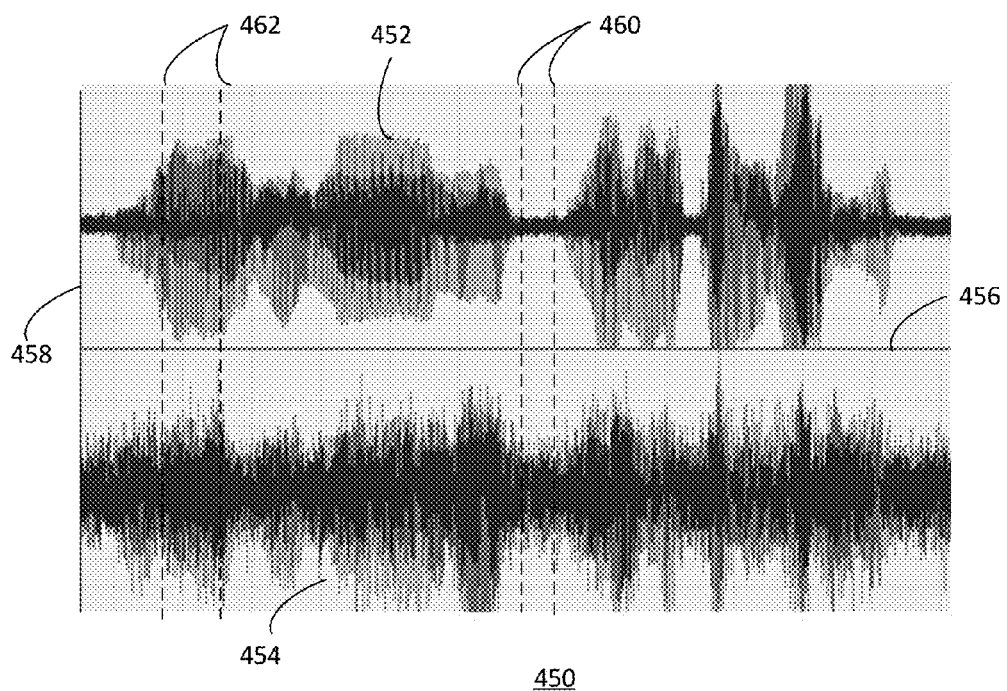
FIG. 5 shows a graph of a signal detected via a speaker and the microphone of the headset of FIG. 4B.

FIG. 5 shows a graph of speech in a noisy environment 450 for the headset 400 detected simultaneously via the headset speaker 402 and the microphone 404. The headset 400 is positioned with the speaker 402 closely coupled to the ear of a user 416. The x-axis 456 denotes time and the y-axis 458 denotes amplitude. The graph line 452 shows speech detected via the headset speaker 402 when configured as a microphone. The graph line 454 shows the same user speech detected via the microphone 404 of FIG. 4B which may be located on the headset cable 408. The region between the dashed lines 460 illustrates a portion of the signal containing noise only. The region between the dashed lines 462 illustrates a portion of the signal containing speech and noise. As can be seen the level of noise in region 460 detected via the speaker 402 configured as a microphone is lower than the level of noise in region 460 detected via the microphone 404.

Figure 6:
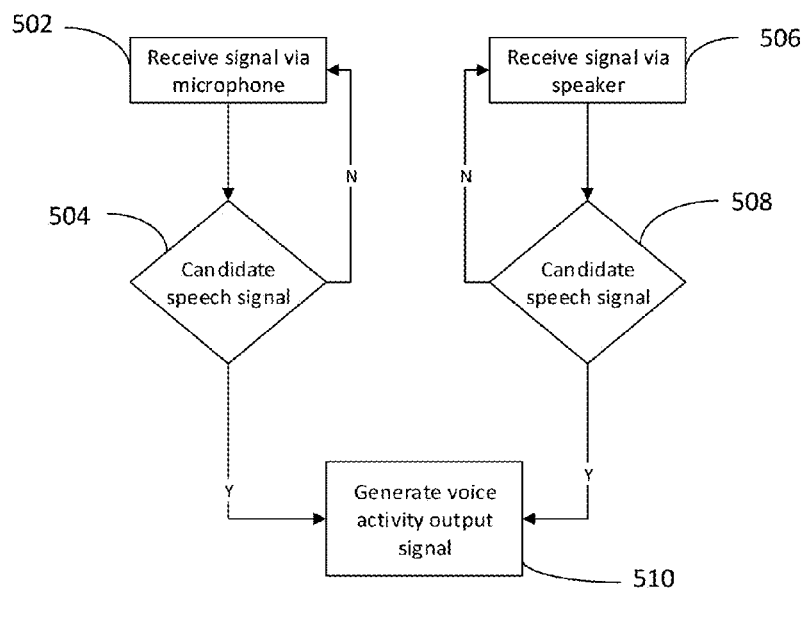
FIG. 6 shows a method of voice activity detection according to an embodiment.

FIG. 6 shows a method of voice activation 500. In step 502 a signal is received via a microphone. The method then moves to step 504 where a check is made to determine whether or not a candidate speech signal has been detected. If a candidate speech signal has not been detected, the method returns to step 502. If a candidate speech signal has been detected, then a voice activity output signal is generated in step 510. In parallel to step 502, in step 506 a signal is received via a speaker configured as a microphone. In step 508 the signal received is checked to determine whether or not it is a candidate speech signal. If no speech is detected then the method returns to step 506. If speech has been detected, the method moves to step 510 and the voice activity output signal may be generated.

Herein is described a voice activation system including a first voice activity detector for receiving a first signal from a microphone; a second voice activity detector for receiving a second signal from a speaker; a voice detector output coupled to the output of the first voice activity detector and the second voice activity detector. The first detector and the second detector are operable to generate an output signal in response to a candidate speech signal received on the respective detector inputs and the voice activation system is configured to generate a voice detector output signal when at least one of the first detector output and the second detector output indicate that speech has been detected. The voice activation system may reduce the average power consumption and increase the recognition rate of an always-on voice activation solution for headsets or other mobile audio devices.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A voice activation system for a mobile audio device comprising a speaker and a microphone, the voice activation system comprising:
a first voice activity detector having a first detector input for receiving a first signal from a microphone and a first detector output;
a second voice activity detector having a second detector input for receiving a second signal from a speaker and a second detector output;
a voice detector output coupled to the first detector output and the second detector output;
wherein the first voice activity detector and the second voice activity detector are operable to generate an output signal in response to a candidate speech signal received on the respective detector inputs and wherein the voice activation system is configured to generate a voice detector output signal when at least one of the first detector output and the second detector output indicate that speech has been detected.

2. The voice activation system of claim 1 wherein the voice activity detector is configured to generate a voice detector output signal when both the first detector output and the second detector output indicate that speech has been detected.

3. The voice activation system of claim 1 having a first power mode and a second power mode, wherein in the first power mode, only the second voice activity detector is enabled and wherein in the second power mode, both the first voice activity detector and the second voice activity detector are enabled and wherein in operation the voice activation system is configured to change from the first power mode to the second power mode in response to the second detector indicating that speech has been detected.

4. The voice activation system of claim 1 further comprising a keyword recognizer having a first keyword recognizer input configured to receive at least one of the first signal, the second signal, and a weighted mix of the first signal and the second signal, and a second keyword recognizer input coupled to the voice detector output, wherein the keyword recognizer is enabled in response to speech being detected, and wherein the keyword recognizer is operable to generate an output in response to a speech signal comprising a keyword received on the first keyword recognizer input.

5. The voice activation system of claim 1 further comprising a speech recognizer having a first speech recognizer input configured to receive at least one of the first signal, the second signal, and a weighted mix of the first signal and the second signal, and a second speech recognizer input coupled to a keyword recognizer output, wherein the speech recognizer is enabled in response to the keyword recognizer indicating that a keyword has been detected.

6. The voice activation system of claim 1 further comprising a speech recognizer having a first speech recognizer input configured to receive at least one of the first signal, the second signal, and a weighted mix of the first signal and the second signal, and a second speech recognizer input coupled to the voice detector output, wherein the speech recognizer is enabled in response to speech being detected.

7. The voice activation system of claim 1 further comprising a microphone buffer coupled to the first detector input, wherein the first voice activity detector is configured to receive a buffered signal from the microphone.

8. The voice activation system of claim 1 further comprising a speaker-as-microphone buffer coupled to the second detector input, wherein the second detector is configured to receive a buffered signal from the speaker when configured as a microphone.

9. A headset comprising the voice activation system of claim 1, the headset comprising a microphone coupled to the first voice activity detector input and a speaker coupled to the second voice activity detector input.

10. A hearing aid comprising the voice activation system of claim 1, the hearing aid comprising a microphone coupled to the first voice activity detector input and a speaker coupled to the second voice activity detector input.

11. A mobile audio device comprising the voice activation system of claim 1, the hearing aid comprising a microphone coupled to the first voice activity detector input and a speaker coupled to the second voice activity detector input.

12. A method of voice activation for an audio device comprising a speaker and a microphone, the method comprising:
  generating a first detector output signal in response to a first signal comprising a candidate speech signal from a microphone;
  generating a second detector output signal in response to a second signal comprising the candidate speech signal from a speaker configured as a microphone;
  generating a voice activity output signal in response to at least one of the first detector output signal and the second detector output signal.

13. The method of claim 12 further comprising generating a voice activity output signal in response to both the first detector output signal and the second detector output signal.

14. The method of claim 12 further comprising changing from a first power mode to the second power mode in response to the first detector output signal, wherein the first power mode has a lower power consumption than the second power mode.

15. The method of claim 12 further comprising activating a keyword detector in response to the voice activity detector output signal.

* * * * *